United States Patent
Guo et al.

(10) Patent No.: US 12,025,863 B2
(45) Date of Patent: Jul. 2, 2024

(54) ELECTRO-OPTIC MODULATOR

(71) Applicant: Huazhong University of Science and Technology, Wuhan (CN)

(72) Inventors: Weihua Guo, Wuhan (CN); Yongqian Tang, Wuhan (CN); Qiaoyin Lu, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 218 days.

(21) Appl. No.: 17/868,820

(22) Filed: Jul. 20, 2022

(65) Prior Publication Data

US 2023/0359070 A1 Nov. 9, 2023

(30) Foreign Application Priority Data

May 6, 2022 (CN) .......................... 202210485045.7

(51) Int. Cl.
G02B 6/293 (2006.01)
G02F 1/035 (2006.01)
G02F 1/225 (2006.01)

(52) U.S. Cl.
CPC ........... *G02F 1/035* (2013.01); *G02B 6/2935* (2013.01); *G02F 1/2255* (2013.01); *G02F 2202/20* (2013.01)

(58) Field of Classification Search
CPC .................................................. G02B 6/2935
See application file for complete search history.

(56) References Cited

U.S. PATENT DOCUMENTS 10,831,044 B1 * 11/2020 Doerr .................... G02F 1/2255
2020/0081314 A1 * 3/2020 Parvizi .................. G02F 1/2255

FOREIGN PATENT DOCUMENTS

JP 2006259543 A * 9/2006 ............. G02F 1/035

* cited by examiner

*Primary Examiner* — Charlie Y Peng
(74) *Attorney, Agent, or Firm* — MATTHIAS SCHOLL P.C.; Matthias Scholl

(57) ABSTRACT

An optical structure includes an input waveguide, a beam splitter, a first arm, a second arm, a beam combiner, and an output waveguide. The first arm and the second arm each include a conventional waveguide region and a modulation waveguide region. The modulation waveguide region of the first arm includes a first modulation waveguide region and a second modulation waveguide region. The modulation waveguide region of the second arm includes a third modulation waveguide region and a fourth modulation waveguide region. The electrical structure includes a traveling wave electrode including a ground-signal-signal-ground electrode structure. The traveling wave electrode includes a signal input region, a modulation electrode region, and a matching resistor region. The modulation electrode region includes a first modulation electrode region and a second modulation electrode region. The first modulation electrode region is connected to the second modulation electrode region.

10 Claims, 9 Drawing Sheets

ELECTRO-OPTIC MODULATOR

CROSS-REFERENCE TO RELATED APPLICATIONS

Pursuant to 35 U.S.C. § 119 and the Paris Convention Treaty, this application claims foreign priority to Chinese Patent Application No. 202210485045.7 filed May 6, 2022, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of optical communication devices, and more particularly, to an electro-optic modulator.

Lithium niobate is a material with excellent electro-optic property and low loss in the C-band, and thus is commonly used for optical modulation. Thin-film lithium niobate modulators feature low modulation voltage, high modulation bandwidth and low-loss electrode, and have great prospects in the field of optical communication.

Conventional drivers for electro-optical modulators are a differential drive originally developed for silicon optical modulators and indium-phosphide (InP)-based optical (InP) modulators. Next-generation photonic integrated circuits require the electro-optic modulators have high modulation efficiency and chip-scale dimensions and operate at CMOS-compatible drive voltages. As a result, it is necessary to develop a thin-film X-cut lithium niobate modulator in a differential drive for highly efficient compatibility with conventional drivers.

SUMMARY

The disclosure provides an electro-optic modulator.

The electro-optic modulator comprises an optical structure and an electrical structure.

The optical structure comprises an input waveguide, a beam splitter, two arms, a beam combiner, and an output waveguide; the two arms comprise a first arm and a second arm each comprising a conventional waveguide region and a modulation waveguide region; the modulation waveguide region of the first arm comprises a first modulation waveguide region and a second modulation waveguide region; the modulation waveguide region of the second arm comprises a third modulation waveguide region and a fourth modulation waveguide region.

The electrical structure comprises a traveling wave electrode comprising a ground-signal-signal-ground electrode structure; the traveling wave electrode comprises a signal input region, a modulation electrode region, and a matching resistor region; the modulation electrode region comprises a first modulation electrode region and a second modulation electrode region; the first modulation electrode region is connected to the second modulation electrode region; the first modulation electrode region and the second modulation electrode region both comprise a first ground electrode, a first signal electrode, a second signal electrode, and a second ground electrode.

In the first modulation electrode region, the first modulation waveguide region is disposed between the first ground electrode and the first signal electrode, and the third modulation waveguide region is disposed between the first signal electrode and the second signal electrode; in the second modulation electrode region, the second modulation waveguide region is disposed between the first signal electrode and the second signal electrode, and the fourth modulation waveguide region is disposed between the second signal electrode and the second ground electrode; the matching resistor region comprises a first matching resistor, a second matching resistor, and a virtual ground electrode; the first matching resistor is disposed between the first signal electrode and the virtual ground electrode; the second matching resistor is disposed between the second signal electrode and the virtual ground electrode; and the first ground electrode is connected to the second ground electrode via the virtual ground electrode.

The optical structure is constructed from X-cut lithium niobate and successively comprises a substrate layer, a first low-refractive index cladding, a lithium niobate film, and a second low-refractive index cladding; a direction perpendicular to the lithium niobate film is taken as X-direction; a direction of an electric field applied between the signal electrodes and the ground electrodes is taken as Z-direction; an optical beam traveling along the modulation electrode regions is taken as Y-direction; and the optical structure is formed by etching the lithium niobate film or disposing a waveguide structure on the lithium niobate film.

In a class of this embodiment, differential signals are input to the traveling wave electrode and comprises a positive voltage V and a negative voltage –V; the positive voltage V is applied between the first signal electrode and the first ground electrode; the negative voltage –V is applied between the second signal electrode and the second ground electrode.

In a class of this embodiment, the first (third) modulation waveguide region is connected to the second (fourth) modulation waveguide region; first (second) ferroelectric domains are formed in the first (third) modulation waveguide region and second (fourth) modulation waveguide region and polarized in opposite directions; and a high electric field is applied to polarize the first (second) ferroelectric domains in two opposite directions.

In a class of this embodiment, the first ferroelectric domains and the second ferroelectric domains are polarized in the same direction in the modulation electrode regions of the first arm and the second arm.

In a class of this embodiment, the first arm, the second arm, and the traveling wave electrode are bent into the shape of letter U.

In the first modulation electrode region, the first modulation waveguide region is disposed between the first ground electrode and the first signal electrode; in the second modulation electrode region, the second modulation waveguide region is disposed between the first signal electrode and the second signal electrode; the first modulation waveguide region is connected to the second modulation waveguide region via a bent waveguide, and the first ferroelectric domains thereof are polarized in the same direction.

In the first modulation electrode region, the third modulation electrode region is disposed between the first signal electrode and the second signal electrode; in the second modulation electrode region, the fourth modulation electrode region is disposed between the second signal electrode and the second ground electrode; a ferroelectric domain of the third modulation electrode region is polarized in the same direction as that of the first modulation electrode region, and a ferroelectric domain of the fourth modulation electrode region is polarized in the same direction as that of the second modulation electrode region.

The first arm and the second arm meet at a single point on the bent waveguide; in the first modulation electrode region, the third modulation waveguide region is disposed between the first signal electrode and the second signal electrode; in the second modulation electrode region, the fourth modulation waveguide region is disposed between the first ground electrode and the first signal electrode; and a ferroelectric domain of the third modulation electrode region is polarized in the same direction as that of the first modulation electrode region, and a ferroelectric domain of the fourth modulation electrode region is polarized in the same direction as that of the second modulation electrode region.

The following advantages are associated with the electro-optic modulator of the disclosure:

The electro-optic modulator is in a differentially driven configuration thus improving the modulation efficiency; and its bent shape reduces the modulation voltage and shortens the length of the entire structure, making more efficient electro-optic modulator for photonic integrated circuits.

DETAILED DESCRIPTION OF THE DRAWINGS

Figure 1:
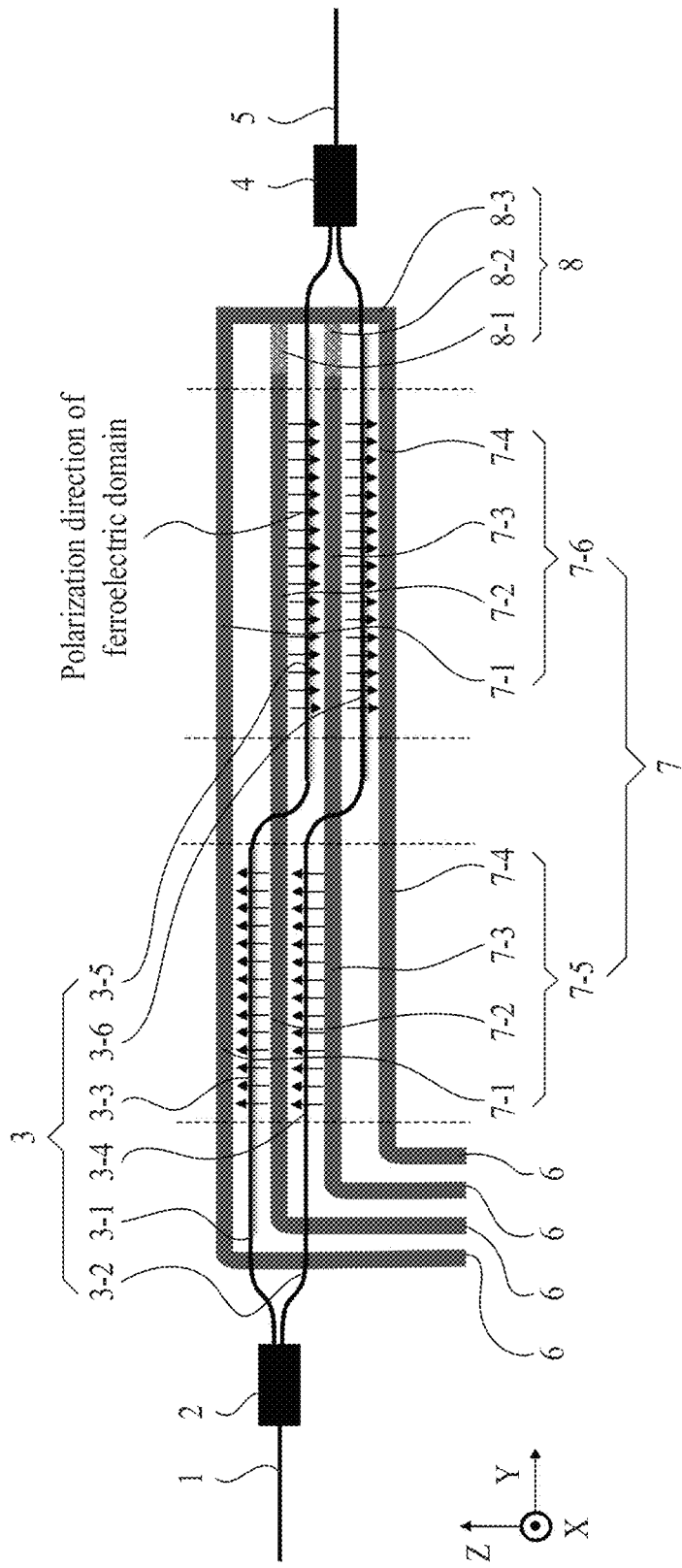
FIG. 1 is a top view of an electro-optic modulator according to Example 1 of the disclosure.
Figure 2:
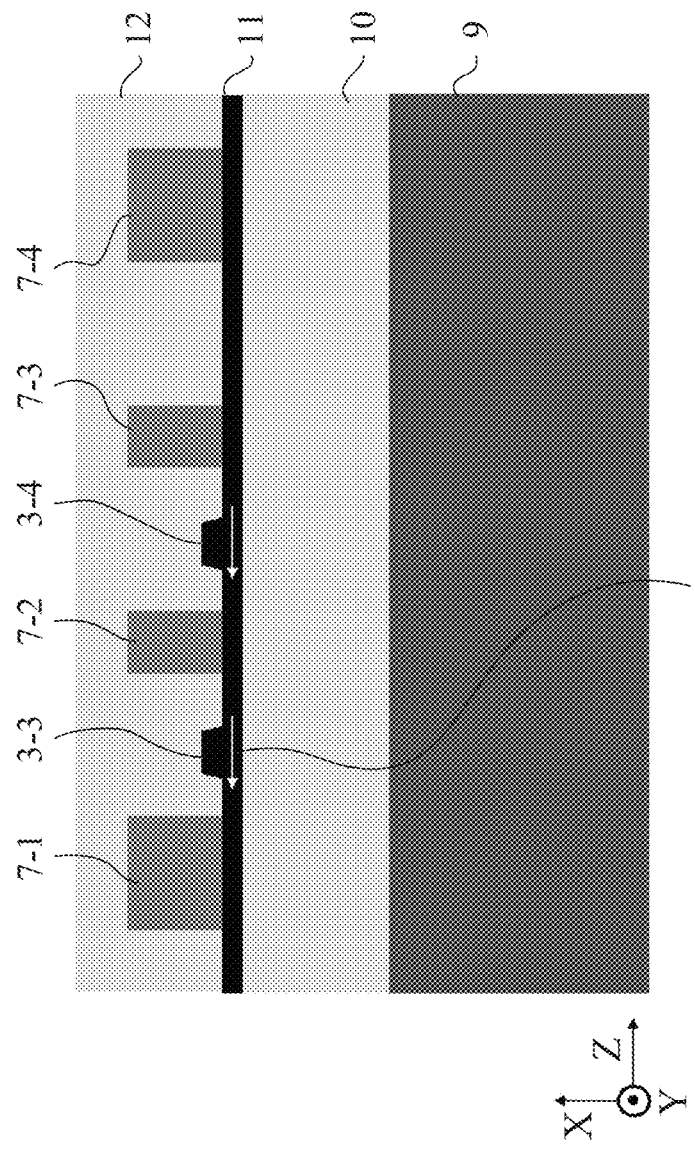
FIG. 2 is a cross-sectional view of a first modulation electrode region according to Example 1 of the disclosure.
Figure 3:
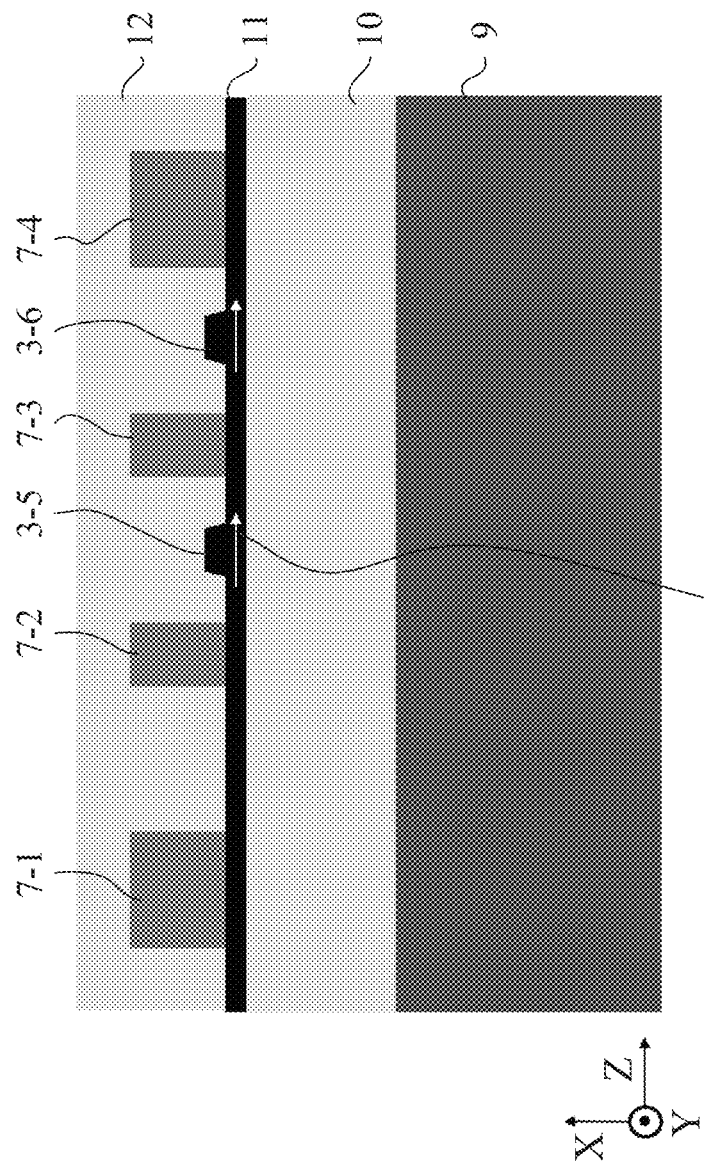
FIG. 3 is a cross-sectional view of a second modulation electrode region according to Example 1 of the disclosure.
Figure 4:
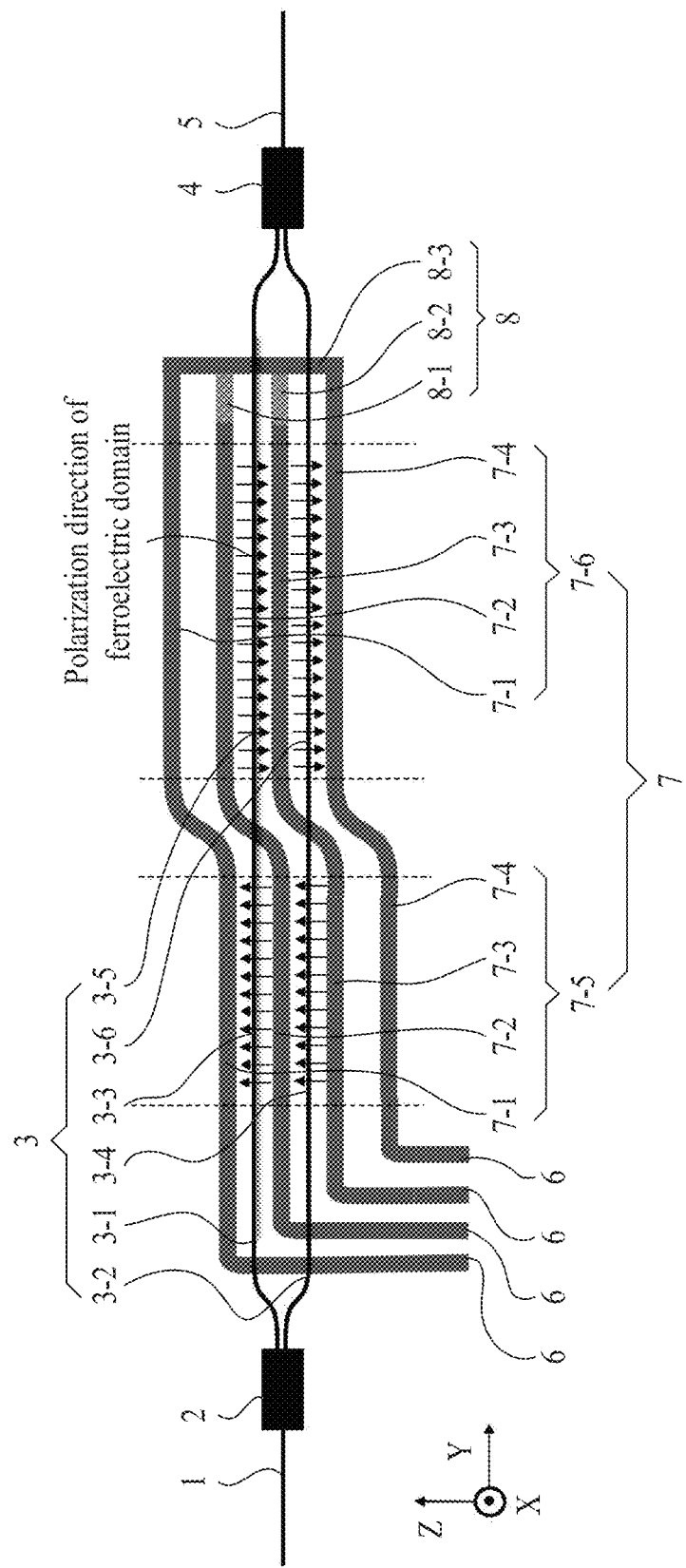
FIG. 4 is a top view of an electro-optic modulator according to Example 2 of the disclosure.
Figure 5:
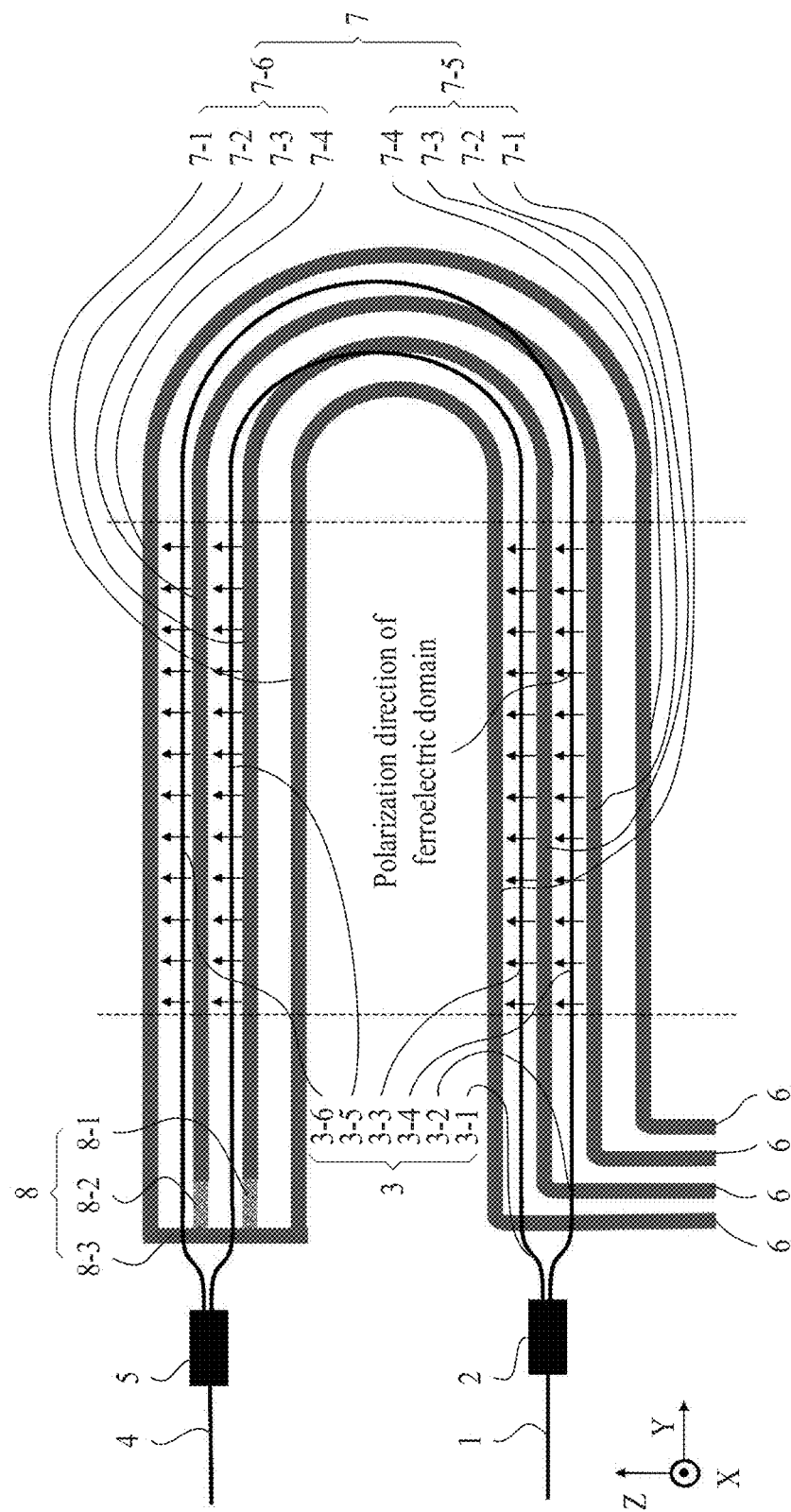
FIG. 5 is a top view of an electro-optic modulator according to Example 3 of the disclosure.
Figure 6:
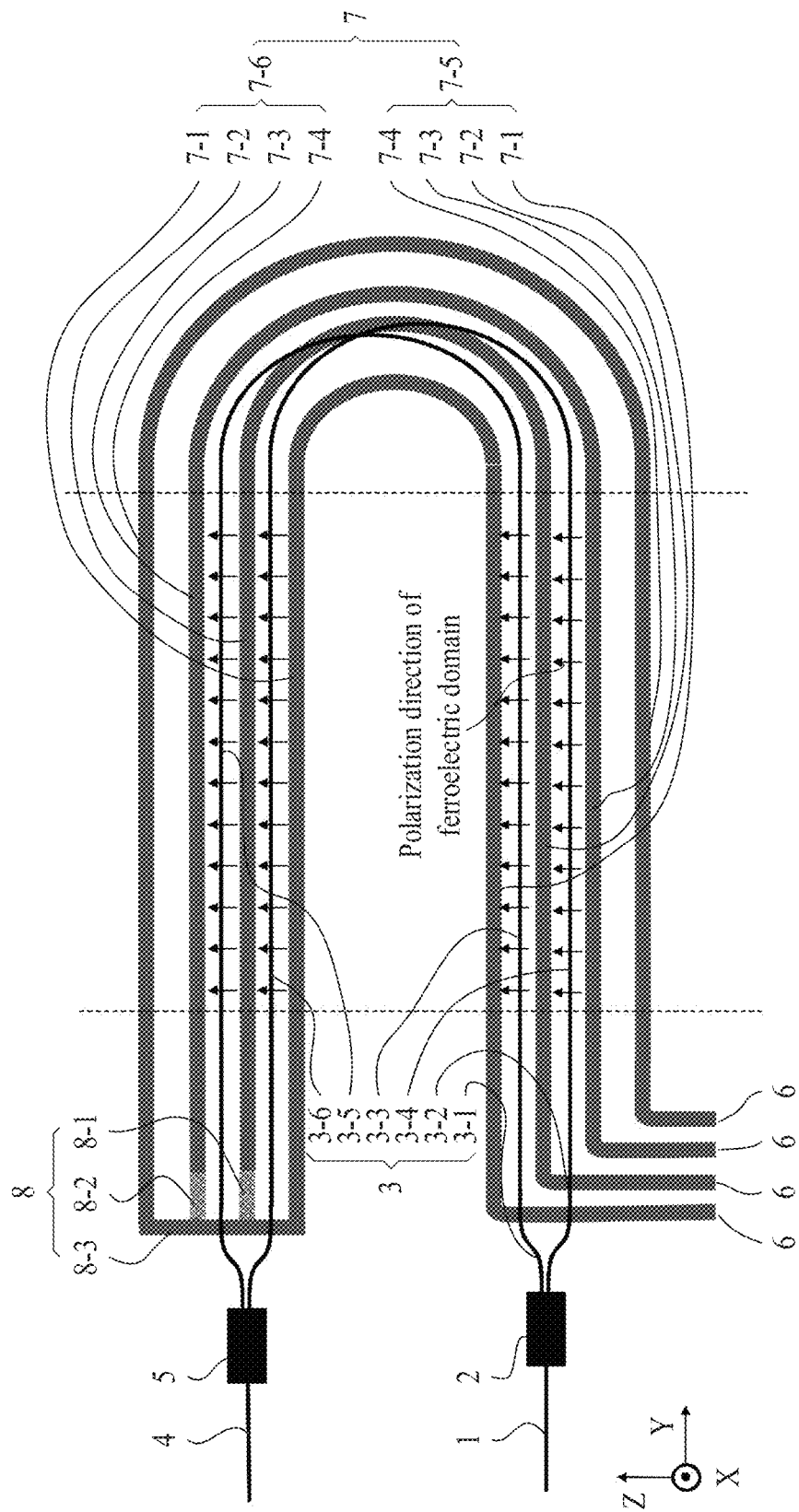
FIG. 6 is a top view of an electro-optic modulator according to Example 4 of the disclosure.
Figure 7:
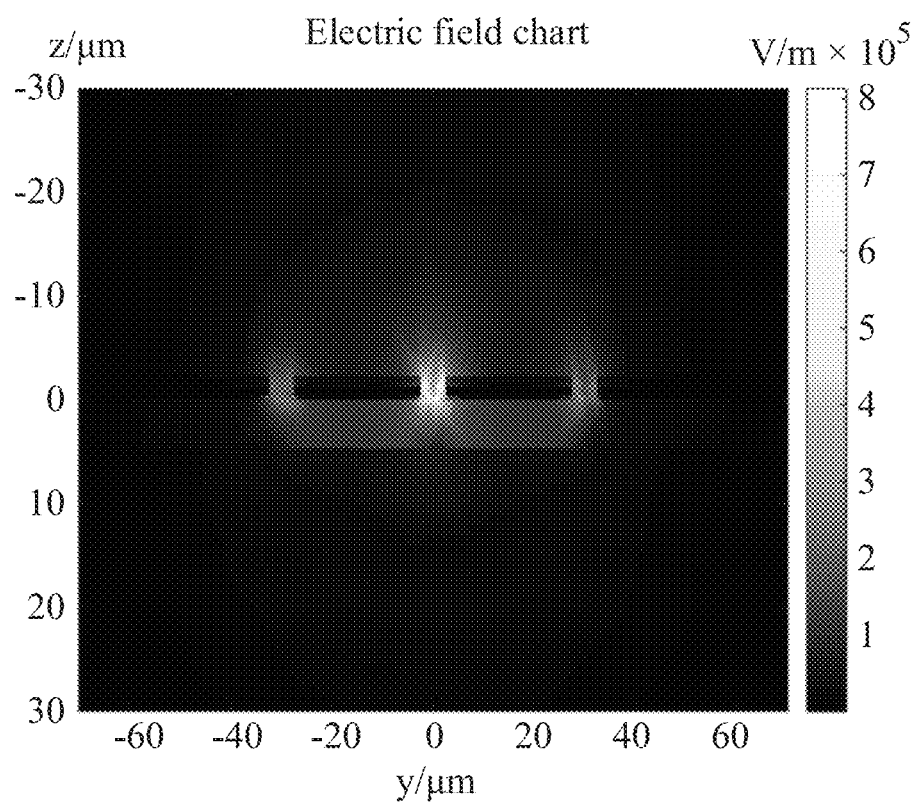
FIG. 7 is a schematic diagram of an electric field applied to a traveling wave electrode according to Example 1 of the disclosure.
Figure 8:
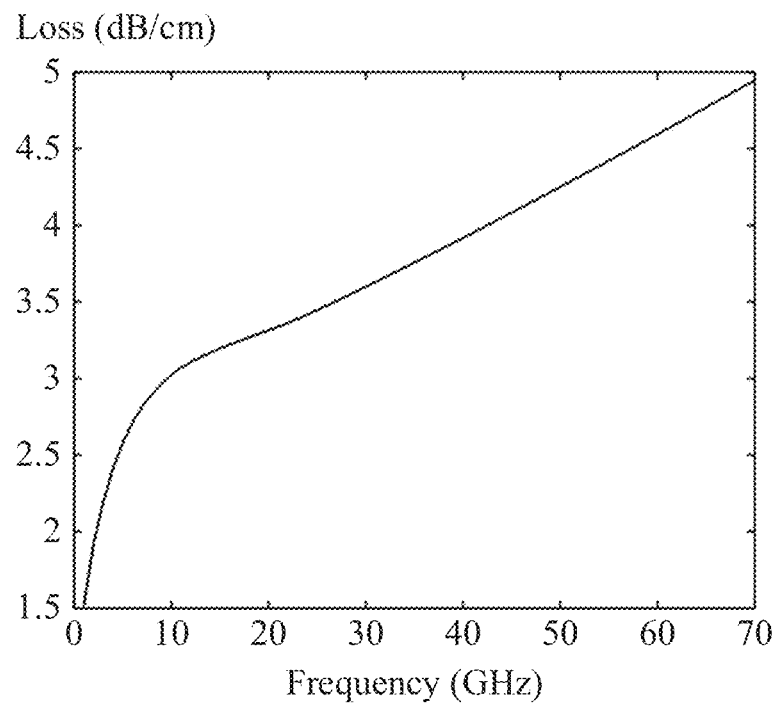
FIG. 8 is a graph of loss in a traveling wave electrode versus modulation frequency according to Example 1 of the disclosure.

In the drawings, the following reference numbers are used: 1. Input waveguide; 2. Beam splitter; 3. Arm; 3-1. First arm; 3-2. Second arm; 3-3. First modulation waveguide region; 3-4. Third modulation waveguide region; 3-5. Second modulation waveguide region; 3-6. Fourth modulation waveguide region; 4. Beam combiner; 5. Output waveguide; 6. Signal input region; 7. Modulation electrode region; 7-1 First ground electrode; 7-2. First signal electrode; 7-3. Second signal electrode; 7-4. Second ground electrode; 7-5. First modulation electrode region; 7-6. Second modulation electrode region; 8. Matching resistor region; 8-1. First matching resistor; 8-2. Second matching resistor; 8-3. Virtual ground electrode 8-3; 9. Substrate layer; 10. First low-refractive index cladding; 11. Lithium niobate film; and 12. Second low-refractive index cladding.

DETAILED DESCRIPTION

Example 1

Referring FIGS. 1, 2, 3, 7, 8, 9, 10, and 11, an electro-optic modulator comprises an optical structure and an electrical structure.

The optical structure comprises an input waveguide 1, a beam splitter 2, a plurality of waveguide arms 3, a beam combiner 4, and an output waveguide 5; the plurality of waveguide arms 3 comprise a first arm 3-1 and a second arm 3-2 each comprising a conventional waveguide region and a modulation waveguide region; the modulation waveguide region of the first arm comprises a first modulation waveguide region 3-3 and a second modulation waveguide region 3-5; the modulation waveguide region of the second arm comprises a third modulation waveguide region 3-4 and a fourth modulation waveguide region 3-6.

The electrical structure comprises a traveling wave electrode comprising a ground-signal-signal-ground electrode structure; the traveling wave electrode comprises a signal input region 6, a modulation electrode region 7, and a matching resistor region 8; the modulation electrode region 7 comprises a first modulation electrode region 7-5 and a second modulation electrode region 7-6; the first modulation electrode region 7-5 is connected to the second modulation electrode region 7-6 via a straight electrode; the first modulation electrode region 7-5 and the second modulation electrode region 7-6 both comprise a first ground electrode 7-1, a first signal electrode 7-2, a second signal electrode 7-3, and a second ground electrode 7-4.

In the first modulation electrode region 7-5, the first modulation waveguide region is disposed between the first ground electrode and the first signal electrode, and the third modulation waveguide region is disposed between the first signal electrode 7-2 and the second signal electrode 7-3; in the second modulation electrode region 7-6, the second modulation waveguide region is disposed between the first signal electrode 7-2 and the second signal electrode 7-3, and the fourth modulation waveguide region is disposed between the second signal electrode 7-3 and the second ground electrode 7-4; the matching resistor region 8 comprises a first matching resistor 8-1, a second matching resistor 8-2, and a virtual ground electrode 8-3; the first matching resistor 8-1 is disposed between the first signal electrode 7-2 and the virtual ground electrode 8-3; the second matching resistor 8-2 is disposed between the second signal electrode 7-3 and the virtual ground electrode 8-3; and the first ground electrode 7-1 is connected to the second ground electrode 7-4 via the virtual ground electrode 8-3.

The optical structure is constructed from X-cut lithium niobate and successively comprises a substrate layer 9, a first low-refractive index cladding 10, a lithium niobate film 11, and a second low-refractive index cladding 12; a direction perpendicular to the lithium niobate film 11 is taken as X-direction; a direction of an electric field applied between the signal electrodes and the ground electrodes is taken as Z-direction; an optical beam propagating along the modulation electrode regions is taken as Y-direction; and the optical structure is formed by etching the lithium niobate film 11 or disposing a waveguide structure on the lithium niobate film 11.

Further, differential signals are applied to the traveling wave electrode and comprises a positive voltage V and a negative voltage –V; the positive voltage V is applied between the first signal electrode 7-2 and the first ground electrode 7-1; the negative voltage –V is applied between the second signal electrode 7-3 and the second ground electrode 7-4.

Further, the first modulation waveguide region 3-3 is connected to the second modulation waveguide region 3-5, and first ferroelectric domains are formed in the first modulation waveguide region 3-3 and the second modulation waveguide region 3-5 and polarized in opposite directions; the third modulation waveguide region 3-4 is connected to the fourth modulation waveguide region 3-6, and second ferroelectric domains are formed in the third modulation waveguide area 3-4 and the fourth modulation waveguide region 3-6 and are polarized in opposite directions; and a high electric field is applied to polarize the first ferroelectric domains or the second ferroelectric domains in two opposite directions.

Further, a ferroelectric domain of the third modulation waveguide region 3-4 is polarized in the same direction as that of the first modulation waveguide region 3-3, and a ferroelectric domain of the fourth modulation waveguide region 3-6 is polarized in the same direction as that of the second modulation waveguide region 3-5.

Further, the traveling wave electrode comprises a coplanar waveguide structure; the traveling wave electrode comprises a layer of Aurum (Au) with a thickness of 0.9 μm; the first signal electrode 7-2 and the second signal electrode 7-3 both have a width of 25 μm; a distance between the first signal electrode 7-2 and the second signal electrode 7-3 or between the first (second) signal electrode and the first (second) ground electrode is 5 μm.

Further, the substrate layer 9 comprises silicon (Si) having a refractive index of 3.49, a relative dielectric constant is 11.9, and a thickness of 500 μm; the first low-refractive index cladding 10 comprises $SiO_2$ having a refractive index of 1.44, a relative dielectric constant is 3.9, and a thickness of 4.7 μm; the lithium niobate film 11 has a thickness of 0.6 μm, an extraordinary refractive index of $n_e$=2.1376, an ordinary refractive index of $n_o$=2.2111, and relative dielectric constants are $\varepsilon_e$=27.9 and $\varepsilon_o$=44.3; and the second low-refractive index cladding 12 comprises $SiO_2$ having a refractive index of 1.44, a relative dielectric constant is 3.9, and a thickness of 0.8 μm.

Further, the two waveguide arms 3 are ridge waveguides each having a width of 1.5 μm and a height of 0.3 μm; and each of the ridge waveguides comprises a sidewall with an inclination angle of 76°.

Further, the signal input region 6 is connected to the modulation electrode region 7 via a bent structure; the modulation electrode region 7 and the modulated waveguide region have the same length L of 1 cm.

Further, the first matching resistor 8-1 and the second matching resistor 8-2 both have a resistance of 30Ω, which matches the differential impedance of 60Ω, thus reducing the reflection of a differential-mode signal.

The working principle of the electro-optic modulator in Example 1: an input optical beam enters the input waveguide, is split into two beams by the beam splitter, and enters the first arm and the second arm, respectively; a differential radio-frequency (RF) signal travels through the signal input region, enters the traveling wave electrode, and propagate simultaneously with the optical signals. With the input of differential signals, the voltages applied across the second modulation electrode region 3-5 and the third modulation electrode region 3-4 are twice that of the first modulation electrode region 3-3 and the fourth modulation electrode region 3-6, respectively. Phases in upper and lower arms are gradually accumulated and modulated in opposite so as to achieve a push-pull operation with high modulation efficiency. The lengths of the first modulation electrode region and the second modulation electrode region are adjusted to achieve the same effect of modulation in the first arm and the second arm, so that the modulation chirp is zero. The beam combiner recombines the two optical signals propagating in the first arm and the second arm, so as to convert phase information into intensity data, thus outputting a modulated optical signal.

Example 2

Referring to FIGS. 1, 2, 3, 4, 7, 8, 9, 10, 11, a second example of the electro-optic modulator is similar to Example 1, except for the following specific differences: the first modulation waveguide region 3-3 is connected to the second modulation waveguide region 3-5 via a straight waveguide; the third modulation waveguide region 3-4 is connected to the fourth modulation waveguide region 3-6 via a straight waveguide; and the first modulation electrode region 7-5 is connected to the second modulation electrode region 7-6 via an S-shaped electrode.

The working principle of Example 2 is the same as that of Example 1.

Example 3

Referring to FIGS. 1, 2, 3, 5, 7, 8, 9, 10, 11, a third example of the electro-optic modulator is similar to Example 1, except for the following specific differences: the two arms 3 and the traveling wave electrode are bent into the shape of letter U; the first modulation waveguide region 3-3 is disposed between the first ground electrode 7-1 and the first signal electrode 7-2; the second modulation waveguide region 3-5 is disposed between the first signal electrode 7-2 and the second signal electrode 7-3; the first modulation waveguide region 3-3 is connected to the second modulation waveguide region 3-5 via a first bent waveguide; the first ferroelectric domains are polarized in the same direction; the third modulation waveguide region 3-4 is disposed between the first signal electrode 7-2 and the second signal electrode 7-3; the fourth modulation waveguide region 3-6 is disposed between the second signal electrode 7-3 and the second ground electrode 7-4; the third modulation waveguide region 3-4 is connected to the fourth modulation waveguide region 3-6 via a second bent waveguide; and the second ferroelectric domains are polarized in the same direction as the first ferroelectric domains.

The working principle of the electro-optic modulator in Example 3: an input optical beam enters the input waveguide, is split into two beams by the beam splitter, and enters the first arm and the second arm, respectively; a differential RF signal travels through the signal input region, enters the traveling wave electrode, and propagate simultaneously with the two optical signals. The modulation electrode regions on the same arm are connected via the bent waveguide; the first ferroelectric domains are polarized in the same direction as the second ferroelectric domains; the traveling wave electrode and the two arms are bent into the shape of letter U; and the differential RF signal and the optical signals are bent as well. With the input of differential signals, the voltages applied across the second modulation waveguide region 3-5 and the third modulation waveguide region 3-4 are twice that of the first modulation waveguide region 3-3 and the fourth modulation waveguide region 3-6, respectively.

Phases in upper and lower arms are gradually accumulated and modulated in opposite so as to achieve a push-pull operation with high modulation efficiency. The lengths of the first modulation electrode region and the second modulation electrode region are adjusted to achieve the same effect of modulation in the first arm and the second arm, so that the modulation chirp is zero. The beam combiner recombines the two optical signals propagating in the first arm and the second arm, so as to convert phase information into intensity data, thus outputting a modulated optical signal.

Example 4

Referring to FIGS. 1, 2, 3, 6, 7, 8, 9, 10, 11, a fourth example of the electro-optic modulator is similar to Example 1, except for the following specific differences: the first arm 3-1 and the second arm 3-2 meet at a single point on the bent waveguide; in the first modulation electrode region 7-5, the third modulation waveguide region 3-4 is disposed between the first signal electrode 7-2 and the second signal electrode 7-3; in the second modulation electrode region 7-6, the fourth modulation waveguide region 3-6 is disposed between the first ground electrode 7-1 and the first signal electrode 7-2; and the second ferroelectric domains are polarized in the same direction as the first ferroelectric domains.

The working principle of Example 4 is the same as that of Example 1.

Example 5

Referring to FIGS. 1, 2, 3, 6, 7, 8, 9, 10, 11, a fifth example of the electro-optic modulator is similar to Example 1, except for the following specific differences: in the first modulation electrode region 7-5, the first modulation waveguide region 3-3 is disposed between the first signal electrode 7-2 and the second signal electrode 7-3; in the second modulation electrode region 7-6, the second modulation waveguide region 3-5 is disposed between the first ground electrode 7-1 and the first signal electrode 7-2; in the first modulation electrode region 7-5, the third modulation waveguide region 3-4 is disposed between the second signal electrode 7-3 and the second ground electrode 7-4; in the second modulation electrode region 7-6, the fourth modulation waveguide region 3-6 is disposed between the first signal electrode 7-2 and the second signal electrode 7-3.

The working principle of Example 5 is the same as that of Example 1.

Examples 2-4 may be changed in a way similar to that described in Example 5 and accordingly not described herein.

A finite element method is used to model the optical structure and the traveling wave electrode structure. At 1550 nm wavelength, a loss in the modulation electrode is less than 0.1 dB/cm, and a group refractive index is $n_g$=2.258.

When the modulation electrode region has a length of 1 cm and a modulation voltage is 2.1 V, a phase difference $1\pi$ between upper and lower arms is achieved for a conventional thin-film lithium niobate modulator in a common-mode driven configuration; and the electro-optic modulator of the disclosure achieves a $1.5\pi$ phase difference in a differentially driven configuration, which causes an increase of 50% in modulation efficiency. The modulation efficiency $V\pi L$ is the product of the $\pi$ phase shift modulation voltage and the length of the modulation electrode region; when the modulation electrode region has a length of 1 cm and the $\pi$ phase shift modulation voltage is 1.4 V, the electro-optic modulator of the disclosure exhibits the modulation efficiency $V\pi L$ of 1.4 V·cm; and the modulation voltage is compatible with the differential drivers. Compared with a common-mode driven modulator, the modulation efficiency of the modulator of the disclosure is greatly improved.

The electro-optic modulator is in a differentially driven configuration and performs an RF simulation; the results show that a differential impedance of the traveling wave electrode is 60Ω, a loss in the traveling wave electrode is 0.48 dBcm$^{-1}$ GHz$^{-0.5}$, and a microwave refractive index $n_\mu$ is 2.14. FIGS. 5-8 illustrates the results of RF simulation according to Example 1 of the disclosure.

Figure 9:
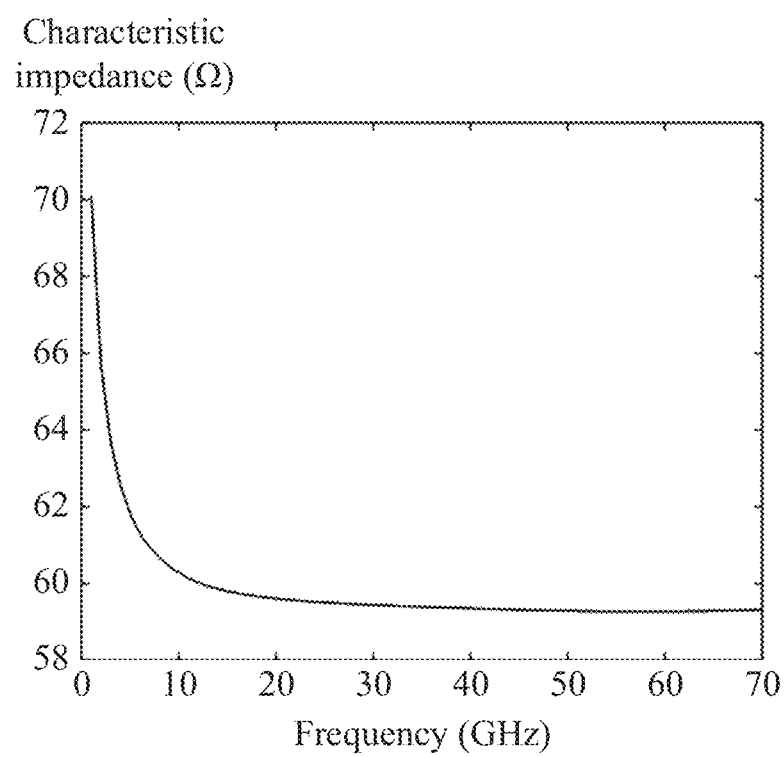
FIG. 9 is a graph of characteristic impedance of a traveling wave electrode versus modulation frequency according to Example 1 of the disclosure.
Figure 10:
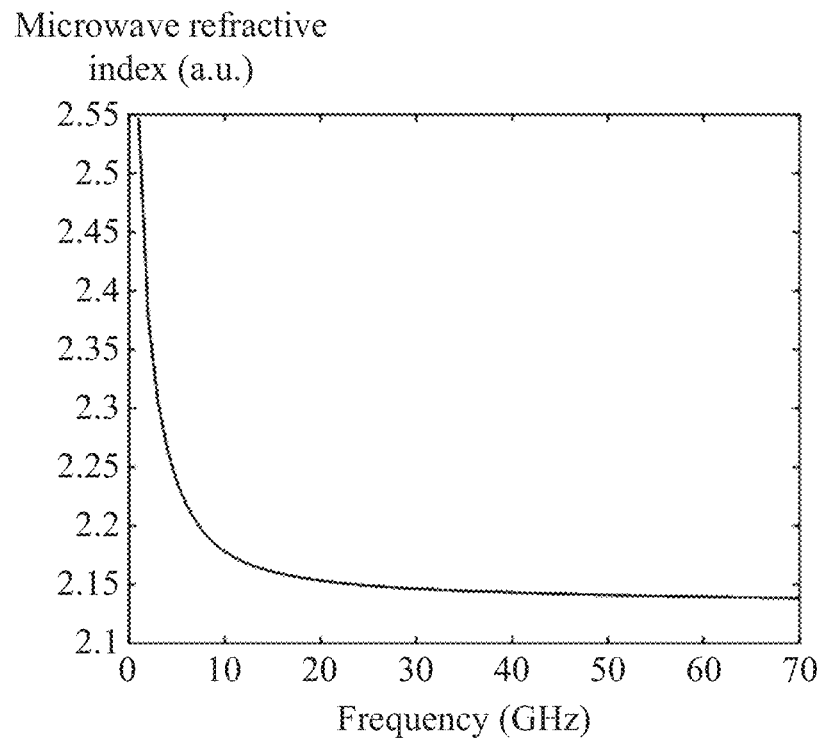
FIG. 10 is a graph of microwave refractive index of a traveling wave electrode versus modulation frequency according to Example 1 of the disclosure.
Figure 11:
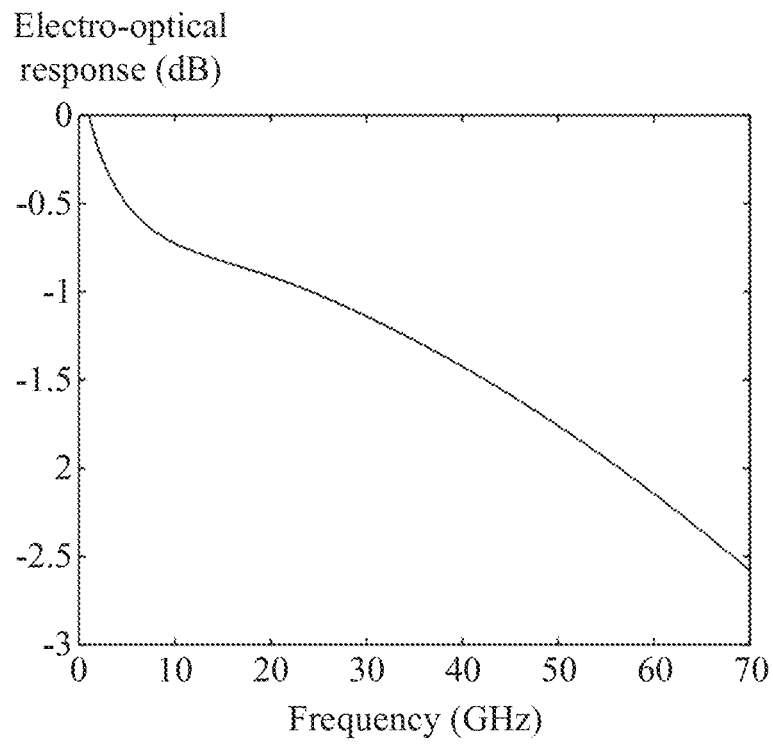
FIG. 11 is a graph of small-signal modulation bandwidth versus modulation frequency according to Example 1 of the disclosure.

FIG. 9 illustrates characteristic electro-optical response curve. The results show that the small-signal 3-dB modulation bandwidth of Example 1 is greater than 70 GHz.

The electro-optic modulator is in a differentially driven configuration for an improved modulation efficiency; and a bent shape reduces a modulation voltage and shortens a length of the entire structure, making more efficient electro-optic modulator for photonic integrated circuits.

It will be obvious to those skilled in the art that changes and modifications may be made, and therefore, the aim in the appended claims is to cover all such changes and modifications.

What is claimed is:

1. An electro-optic modulator, comprising:
an optical structure, the optical structure comprising an input waveguide, a beam splitter, a first arm, a second arm, a beam combiner, and an output waveguide; and
an electric structure, the electrical structure comprising a traveling wave electrode comprising a ground-signal-signal-ground electrode structure;

wherein:
the first arm comprises a first conventional waveguide region, a first modulation waveguide region, and a second modulation waveguide region; the second arm comprises a second conventional waveguide region, a third modulation waveguide region, and a fourth modulation waveguide region;
the traveling wave electrode comprises a signal input region, a modulation electrode region, and a matching resistor region; the modulation electrode region comprises a first modulation electrode region and a second modulation electrode region; the first modulation electrode region is connected to the second modulation electrode region; the first modulation electrode region and the second modulation electrode region both comprise a first ground electrode, a first signal electrode, a second signal electrode, and a second ground electrode; and
in the first modulation electrode region, the first modulation waveguide region is disposed between the first ground electrode and the first signal electrode, and the third modulation waveguide region is disposed between the first signal electrode and the second signal electrode; in the second modulation electrode region, the second modulation waveguide region is disposed between the first signal electrode and the second signal electrode, and the fourth modulation waveguide region is disposed between the second signal electrode and the second ground electrode; the matching resistor region comprises a first matching resistor, a second matching resistor, and a virtual ground electrode; the first matching resistor is disposed between the first signal electrode and the virtual ground electrode; the second matching resistor is disposed between the second signal electrode and the virtual ground electrode; and the first ground electrode is connected to a second ground electrode via the virtual ground electrode.

2. The electro-optic modulator of claim 1, wherein the optical structure is constructed from X-cut lithium niobate and successively comprises a substrate layer, a first low-refractive index cladding, a lithium niobate film, and a second low-refractive index cladding; a direction perpendicular to the lithium niobate film is taken as X-direction; a direction of an electric field applied between the first signal electrode and the second signal electrode, and between the first ground electrode and the second ground electrode is taken as Z-direction; an optical beam traveling along the first modulation electrode region and the second modulation electrode region, and along the third modulation electrode region and the fourth modulation electrode region is taken as Y-direction; and the optical structure is formed by etching the lithium niobate film or disposing a waveguide structure on the lithium niobate film.

3. The electro-optic modulator of claim 1, wherein differential signals are input to the traveling wave electrode and comprises a positive voltage V and a negative voltage –V; the positive voltage V is applied between the first signal electrode and the first ground electrode; and the negative voltage –V is applied between the second signal electrode and the second ground electrode.

4. The electro-optic modulator of claim 1, wherein the first modulation waveguide region is connected to the second modulation waveguide region, and first ferroelectric domains are formed in the first modulation waveguide region and the second modulation waveguide region and polarized in opposite directions; the third modulation waveguide region is connected to the fourth modulation waveguide region, and second ferroelectric domains are formed in the third modulation waveguide region and the fourth modulation waveguide region and are polarized in opposite directions.

5. The electro-optic modulator of claim 4, wherein a ferroelectric domain of the third modulation waveguide region is polarized in the same direction as that of the first modulation waveguide region, and a ferroelectric domain of the fourth modulation waveguide region is polarized in the same direction as that of the second modulation waveguide region.

6. The electro-optic modulator of claim 1, wherein the first arm, the second arm, and the traveling wave electrode are bent into the shape of letter U.

7. The electro-optic modulator of claim 6, wherein the first modulation waveguide region is connected to the second modulation waveguide region via a first bent waveguide, and the first ferroelectric domains in the first modulation waveguide region and the second modulation waveguide region are polarized in the same direction; the third modulation waveguide region is connected to the fourth modulation waveguide region via a second bent waveguide, and the second ferroelectric domains in the third modulation waveguide region and the fourth modulation waveguide region are polarized in the same direction.

8. The electro-optic modulator of claim 7, wherein in the first modulation electrode region, the first modulation waveguide region is disposed between the first ground electrode and the first signal electrode; and in the second modulation electrode region, the second modulation waveguide region is disposed between the first signal electrode and the second signal electrode.

9. The electro-optic modulator of claim 8, wherein in the first modulation electrode region, the third modulation waveguide region is disposed between the first signal electrode and the second signal electrode; in the second modulation electrode region, the fourth modulation waveguide region is disposed between the second signal electrode and the second ground electrode; a ferroelectric domain of the third modulation waveguide region is polarized in the same direction as that of the first modulation waveguide region, and a ferroelectric domain of the fourth modulation waveguide region is polarized in the same direction as that of the second modulation waveguide region.

10. The electro-optic modulator of claim 8, wherein the first arm and the second arm meet at a single point on the bent waveguide; in the first modulation electrode region, the third modulation waveguide region is disposed between the first signal electrode and the second signal electrode; in the second modulation electrode region, the fourth modulation waveguide region is disposed between the first ground electrode and the first signal electrode; a ferroelectric domain of the third modulation waveguide region is polarized in the same direction as that of the first modulation waveguide region, and a ferroelectric domain of the fourth modulation waveguide region is polarized in the same direction as that of the second modulation waveguide region.

* * * * *